United States Patent [19]
Gudleske

[11] Patent Number: 6,079,302
[45] Date of Patent: Jun. 27, 2000

[54] SAW AND SAW BLADE FOR SIMULTANEOUSLY CUTTING AND BEVELING

[76] Inventor: Gustave F. Gudleske, 2770 Sterling Way, Cameron Park, Calif. 95682

[21] Appl. No.: 09/229,038

[22] Filed: Jan. 12, 1999

[51] Int. Cl.[7] ........................................ B23B 1/00
[52] U.S. Cl. .................. 82/47; 7/157; 7/158; 30/94; 82/113; 144/137; 144/218; 144/265; 144/220; 144/230; 144/134.1; 409/138; 409/181; 142/37
[58] Field of Search ................... 30/94, 92, 93; 7/157, 158; 82/46, 47, 57, 113, 70.2, 101; 125/3, 13.01, 13.02; 142/1, 37, 7, 9, 40, 49, 55; 144/218, 136.7, 136.95, 220, 134.1, 154.5, 137; 407/30, 31; 409/138, 165, 181

[56] References Cited

U.S. PATENT DOCUMENTS

| | | | |
|---|---|---|---|
| 3,538,968 | 11/1970 | Gluck | 144/136.1 |
| 3,985,051 | 10/1976 | Brown | 82/101 |
| 3,993,231 | 11/1976 | Monteiru et al. | 144/136.1 |
| 4,009,742 | 3/1977 | Ziegelmeyer | 144/230 |
| 4,064,920 | 12/1977 | Piche | 144/218 |
| 4,188,935 | 2/1980 | Tubesing | 125/13 |
| 4,430,913 | 2/1984 | Williamson | 82/70.2 |
| 4,456,045 | 6/1984 | Gregorie | 144/220 |
| 4,677,886 | 7/1987 | Neu | 144/218 |
| 4,689,883 | 9/1987 | Deut | 30/94 |
| 4,848,422 | 7/1989 | Chiantella | 82/12 |
| 4,984,614 | 1/1991 | Lawders et al. | 144/220 |
| 5,020,221 | 6/1991 | Nelson | 30/169 |
| 5,456,559 | 10/1995 | Taylor | 409/137 |

*Primary Examiner*—W. Donald Bray
*Attorney, Agent, or Firm*—Miller Nash LLP

[57] ABSTRACT

A saw for simultaneously cutting and beveling including a cut-off saw, a cutting blade, and a beveling blade. The cutting blade cuts simultaneously while the beveling blade bevels. The beveling blade preferably has a head with two faces annularly connected by an annular slanted circumference. The head has at least one notch suitable for accommodating a respective at least one tooth insert interconnected with a respective at least one cartridge. Each cartridge is interconnectable with a respective tooth insert.

13 Claims, 4 Drawing Sheets

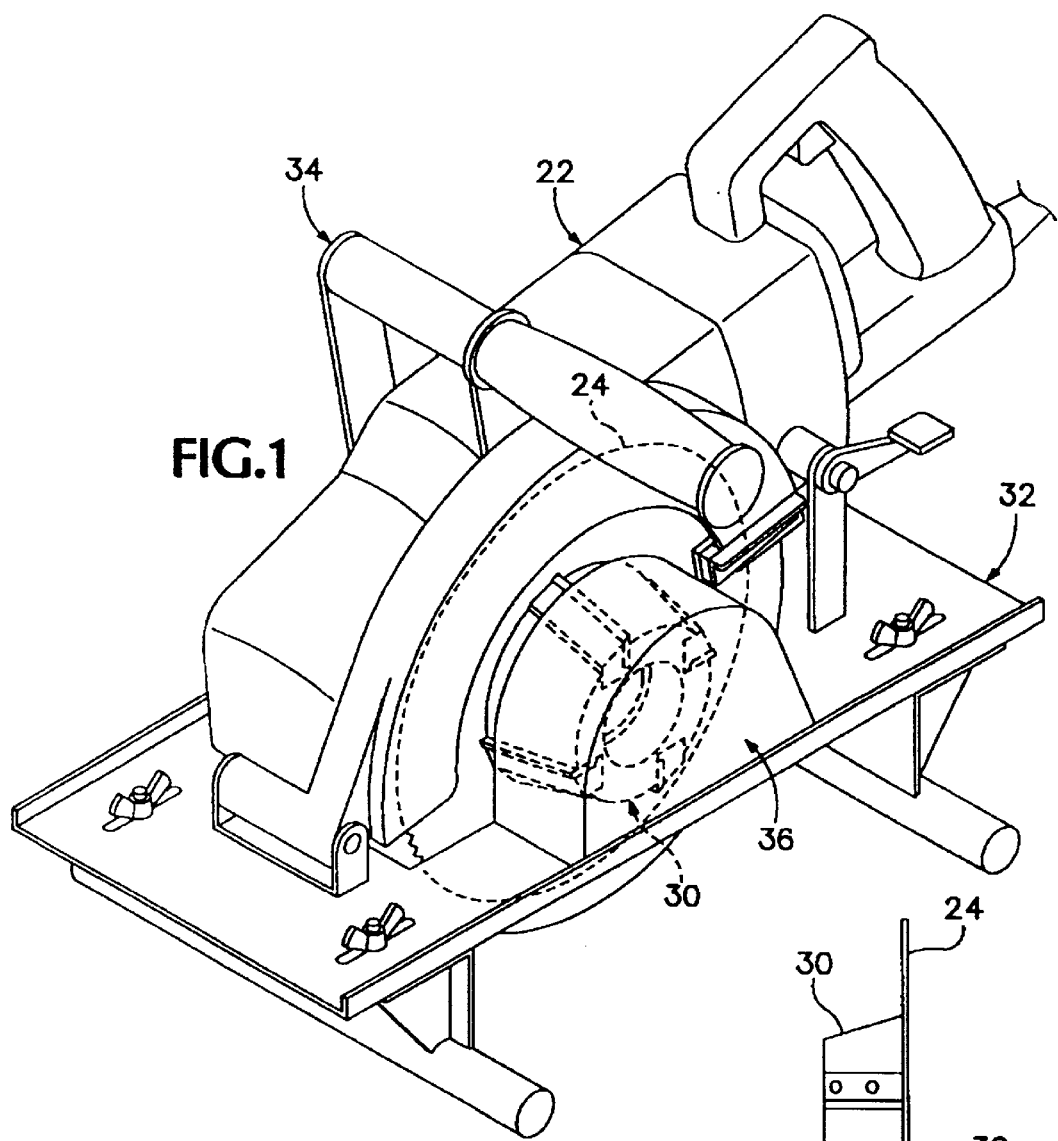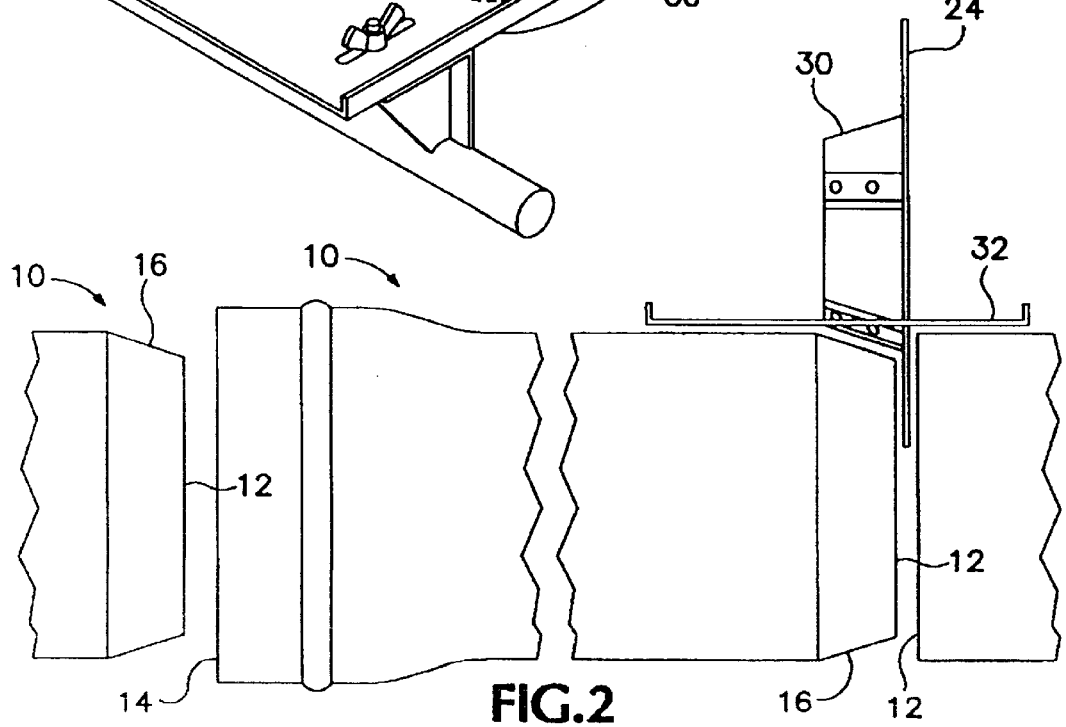

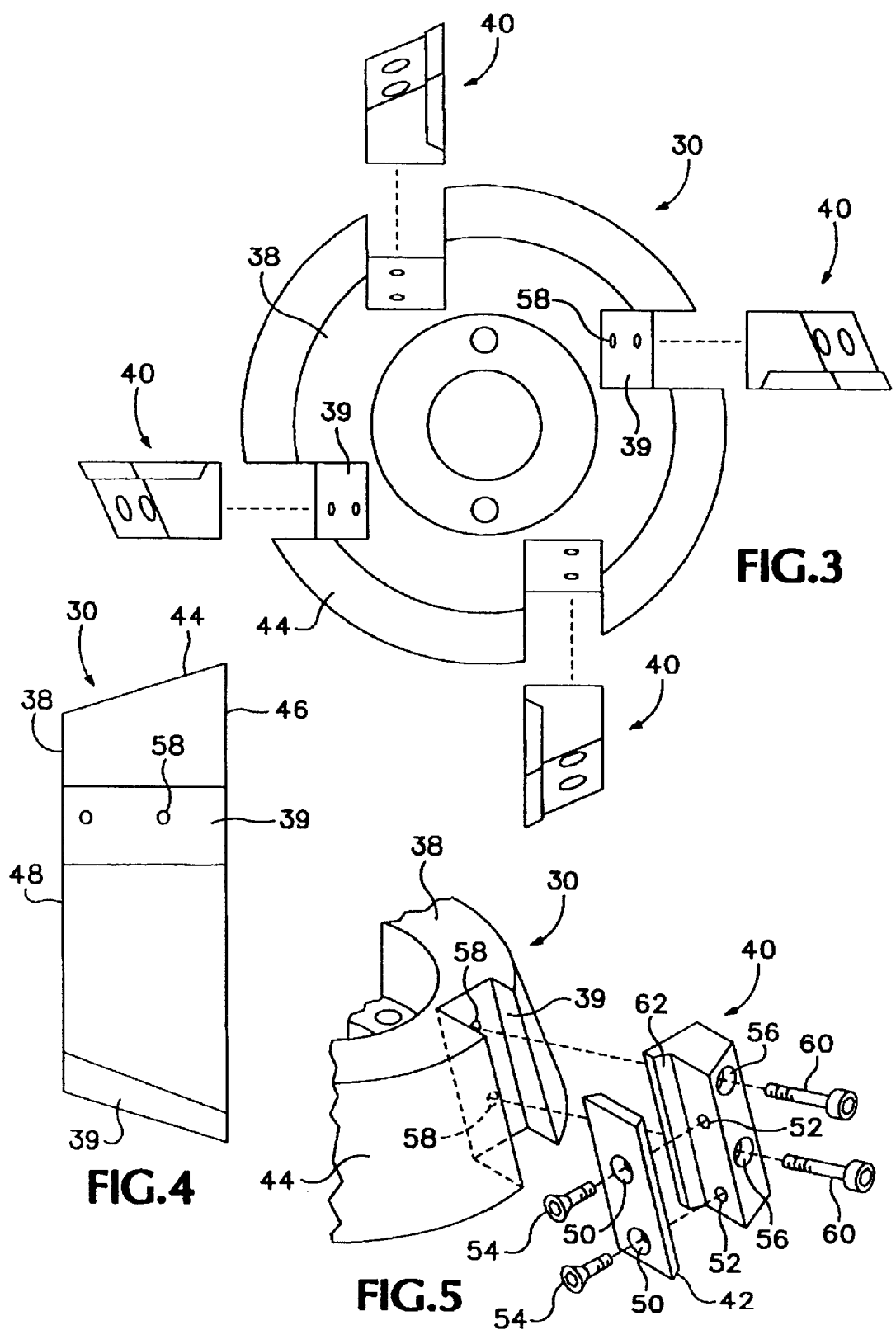

SAW AND SAW BLADE FOR SIMULTANEOUSLY CUTTING AND BEVELING

BACKGROUND OF THE INVENTION

The present invention relates to a saw and saw blade for simultaneously cutting and beveling, and specifically to a handheld saw with a blade for simultaneously cutting and beveling pipe.

A standard water main pipe used in underground water systems generally has a "straight" end and a "bell" end. The pipe is sealed by plugging the straight end of one pipe into the bell end of the next pipe or part in the system. Inside the bell end is a lip seal that the pipe slides through so as to form the water seal. The pipe is produced in standard lengths with a mill or beveled edge on the straight end to allow it to slide past the seal in the bell end without damaging it. Often the standard length pipe often must be shortened, for example, to fit into a joint or elbow to go around a corner, however, after the pipe is cut, it no longer has the factory mill.

One method currently used for cutting and milling pipe uses a standard cut-off saw to cut the pipe as the pipe is rolled a first time and then uses a standard hand grinder to put a mill on the pipe as the pipe is rolled a second time. This two tool method is time consuming, requires the use of two separate tools, and requires that the pipe must be rolled twice.

Another method currently used for cutting and milling pipe uses a standard cut-off saw to cut the pipe as the pipe is rolled a first time and then uses the same cut-off saw to put a mill on the pipe as the pipe is rolled a second time. This second method is not approved by OSHA and produces a sand paper finish. A sand paper finish is not suitable for some applications. Like the two tool method, this method requires that the pipe be rolled twice, once to cut it and once again to mill it. Also, this method is particularly time consuming and produces poor quality results.

Reed Manufacturing Company produces universal pipe cutters (UPC). Universal pipe cutters are popular because, by choosing the proper blade, they are capable of cutting a pipes made from a wide variety different materials including PVC, PE, cast iron, ductile iron, and vitreous clay. Also, the universal pipe cutters can be used in many locations including above ground, below ground such as in a ditch, and under water. Further, only one revolution is to cut most types of pipes. However, operating these universal pipe cutters is far from simple. Some of the operational steps include wrapping a chain around the pipe to secure the cutter to the pipe, connecting the chain, tightening a turnbuckle, attaching a power source, feeding a blade, and pulling the cutting apparatus clockwise around the pipe. Another problem with Reed's universal pipe cutters is the large quantity of equipment and accessories necessary to cut a pipe. For example, in addition to the blade and cutter, a Reed universal pipe cutter would need a chain with a turnbuckle, an air or hydraulic driven motor with a hose system, a filter, a regulator, a lubricator, a water tank with a cart, a hex key set, oil and/or grease, metal wedges, and a set of wrenches. Further, setting up this system is relatively complicated and time consuming.

One blade available for use with the Reed universal pipe cutters can be used to bevel the end of a pipe. The Reed bevel blade is a cylindrical wedge-shaped body which has a plurality of integral teeth. This bevel blade may be used to create a beveled edge. However, if a tooth dulls or breaks, the bevel blade becomes ineffective or useless. The blade must then be returned to a machine shop for any type of repair or maintenance. Such maintenance and repair, therefore, is both time consuming and costly.

U.S. Pat. No. 4,689,883 to Dent discloses a hand held saw for simultaneously cutting and beveling plastic pipe. The Dent saw simultaneously cuts a pipe to the proper length and bevels the ends of both pieces formed by the cutting process. This dual beveling is accomplished by a blade system comprised of a mounting block with slots adapted to accommodate the thick end of at least one cutting blade. The Dent cutting blades are secured by a system of shim plates and set screws. Each cutting blade has two cutting surfaces that form an obtuse angle. A narrowly protruding section separates the two cutting surfaces. The cutting surfaces of the cutting blade extend beyond the mounting block and are subject to breakage. The center portion of the blade, where the two cutting surfaces and the protruding section are located, are particularly susceptible to this breakage. Once broken, the entire cutting blade must be replaced. Another problem is that the Dent saw is limited to cutting beveled edges on both pipe edges. This limits the use of the pipe to those uses associated with beveled edges. Further, dual beveling wastes time and energy when the second, remaining portion of pipe is too short for use. Finally, even if the second portion of pipe is usable, the bevel might be marred if it is not used right away. Other problems with the Dent saw include instability, exposed teeth, spin direction, and other problems that might prevent it from complying with safety regulations.

BRIEF SUMMARY OF THE INVENTION

A saw for simultaneously cutting and beveling according to the present invention preferably includes a cut-off saw, a cutting blade, and a beveling blade adjacent and parallel to the cutting blade. The cutting blade cuts simultaneously while the beveling blade bevels.

The beveling blade preferably has a head having a first face with a first diameter and a second face with a second diameter, the first diameter being greater than the second diameter. The first face is annularly connected to the second face by an annular slanted circumference. The head has at least one notch suitable for accommodating a respective at least one tooth insert interconnected with a respective at least one cartridge. Each cartridge is interconnectable with a respective tooth insert.

Advantages of this invention over the prior methods include a significant time savings, a smoother mill, and an improvement in safety. Further, the invention is hand held so it can be used in the field. Finally, because the teeth are easily removed, if they break or simply need to be sharpened they may be replaced in the field.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIG. 1 is a side perspective view of a preferred embodiment of a cutting tool and beveling blade of the present invention.

FIG. 2 is a front perspective view of the cutting tool and beveling blade of the present invention simultaneously cutting and beveling a pipe.

FIG. 3 is a side plan view of an empty head of the beveling blade of a preferred embodiment of the present invention.

FIG. 4 is a front elevational view of the head of a beveling blade with cartridges and inserts inserted therein.

FIG. 5 is an exploded perspective view of cartridges and inserts of the present invention.

DETAILED DESCRIPTION OF THE INVENTION

Figure 6:
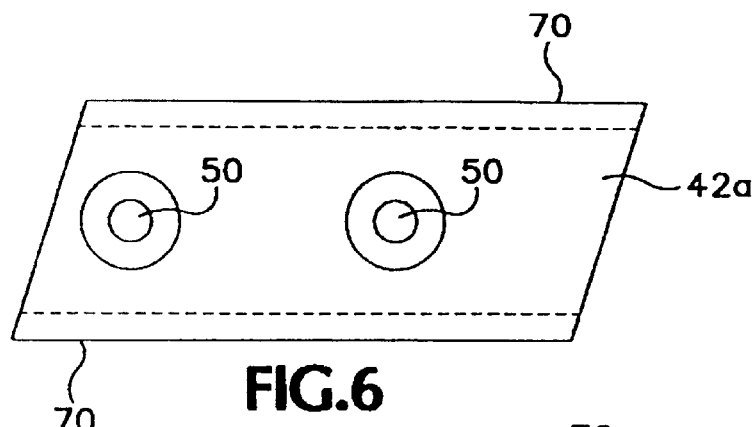
FIGS. 6–7 are face and edge views of one preferred embodiment of the inserts of the present invention.

As shown in FIG. 1, connections between standard water main pipe 10 are usually accomplished by inserting a "narrow" end 12 of a water pipe into a "bell" end 14 of an adjoining water pipe or part of the system. A milled or beveled edge 16 on a narrow end 12 helps create a water tight seal between the narrow end 12 and the bell end 14.

The present invention, as shown in FIGS. 1 and 2, is a hand held cutting and beveling tool 20 designed to simultaneously cut and mill pipe 10. More specifically, the cutting and beveling tool 20 of the present invention is a modified cut-off saw 22 such as a SKILSAW®. A standard cut-off saw 22 includes a circular cutting blade 24 that rotates about an axis of rotation. The present invention adds a second "speed-mill" beveling blade 30 adjacent and parallel to the cutting blade 24. The beveling blade 30 rotates about the same axis of rotation as the cutting blade 24. As the cutting and beveling blades 24 and 30 rotate, they are able to cut and mill a pipe 10 simultaneously. The invention may also include a foot 32, a handle 34, and a safety guard 36.

Figure 10:
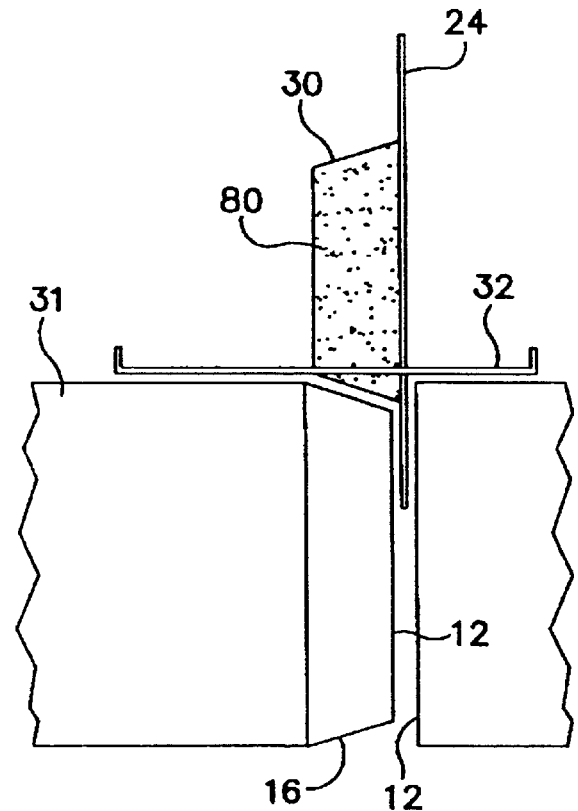
FIG. 10 is a front elevation view of an alternate preferred embodiment of a beveling blade.

The beveling blade includes a head 38, as shown in FIGS. 3, 4, and 10. As shown, the head 38 is substantially in the shape of a bottom slice of a cone. Described in another manner, the shape of the head 38 is cylindrical, but with an annular slanted circumference 44. The annular slanted circumference 44 separates a large face 46 and a small face 48 of the head 38. The degree or angle of the slanted circumference 44 substantially determines the degree or angle of the beveled edge created by the beveling blade.

One preferred embodiment of the beveling blade 30 is comprised of a head 38 with notches 39 into which cartridges 40 with inserts 42 (or teeth) are inserted. FIG. 3 shows an empty head 38 with notches 39. Each notch is suitable for accommodating a respective insert 42 interconnected with a respective cartridge 40. FIG. 4 shows the same head 38 with interconnected cartridges 40 and inserts 42 positioned within the notches 39. Although the head 38 shown in FIGS. 3 and 4 has four notches 39, more or less notches 39 may be used.

FIG. 5 is an exploded view that demonstrates one exemplary method that may be used to interconnect an insert 42 to a respective cartridge 40. As shown, the insert 42 has at least one insert mounting bore 50 therethrough and the cartridge has at least one respective insert mounting hole 52 therein. At least one insert securing apparatus 54, shown as a flathead mounting screw, may be inserted through a respective insert mounting bore 50 and into a respective insert mounting hole 52. This connects an insert 42 to a respective cartridge 40.

FIG. 5 also shows one exemplary method that may be used to secure a cartridge 40 and an interconnected insert 42 within a respective notch 39 in the head 38 of the beveling blade 30. As shown, the cartridge 40 has at least one cartridge mounting bore 56 therethrough and a respective notch 39 has at least one respective cartridge mounting hole 58 therein. At least one cartridge securing apparatus 60, shown as a hexagon mounting bolt, may be inserted through respective cartridge mounting bores 56 and into the cartridge mounting holes 58. This secures an interconnected insert 42 and cartridge 40 within a respective notch 39. It should be noted that the insert mounting holes 52 and cartridge mounting bores 56 are preferably offset to prevent crossing or conflict.

The exemplary method for connecting an insert 42 to a cartridge 40 and the exemplary method for securing the interconnected insert 42 and cartridge 40 within the notch 39 are meant to be exemplary. The shown apparatus and method, however have several advantages. For example, the cartridge ledge 62 of the cartridge 40 helps position the insert 42 correctly. Another exemplary advantage is the use of removable securing apparatus 54, 60 that allows for easy removal and replacement of cartridges 40 and inserts 42.

Figure 7:
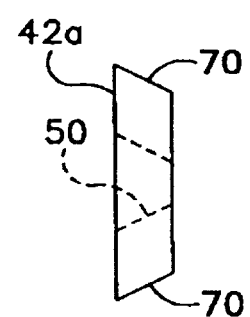

FIGS. 6 and 7 show an insert 42a with two smooth cutting edges 70. By having two cutting edges 70 a damaged or dull tooth may be removed, turned over, and used again with the remaining good cutting edge 70 facing outwards. An alternate embodiment could have a single cutting edge, but it would not be reversible.

Figure 8:
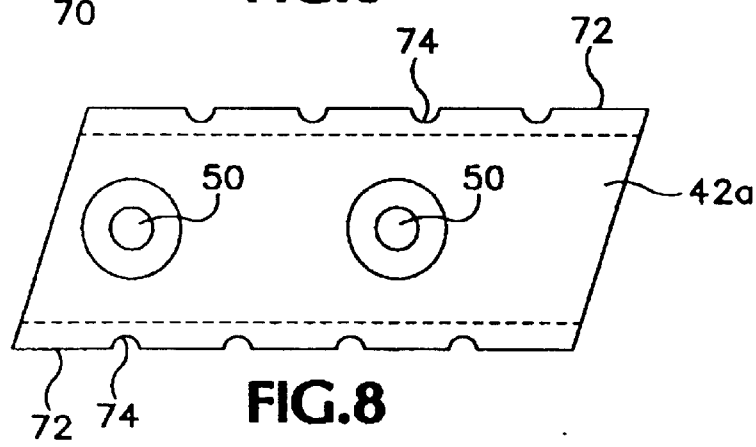
FIGS. 8–9 are face and edge views of an alternate preferred embodiment of the inserts of the present invention.
Figure 9:
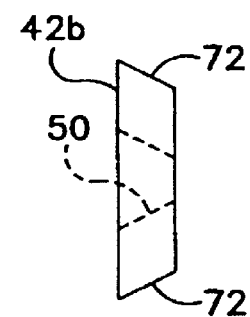

FIGS. 8 and 9 show an alternate insert 42b with two notched cutting edges 72. This embodiment is also reversible, however a single cutting edge version could also be used. The cutting notches 74 function as chip breakers that allow the inserts 42b to make smaller pieces or chips while cutting.

The inserts 42, 42a, 42b may be made from any durable material. Exemplary materials include, but are not limited to carbide, steel, and aluminum. Similarly, the cartridge 40 may be made from any durable material. Exemplary materials include, but are not limited to carbide, steel, and aluminum. Finally, the head 38 may be made from any durable material. Exemplary materials include, but are not limited to carbide, steel, and aluminum.

FIG. 10 shows an alternate beveling blade 30 with an alternate head 80. This alternate head 80 also has a annular slanted circumference 82. The annular slanted circumference has a granular surface 84 that is capable of beveling pipe 10. This alternate head 80 is particularly suited to beveling thinner walled pipe that is not meant to be pressurized. The alternate head 80 could also be adapted to other uses.

Figure 11:
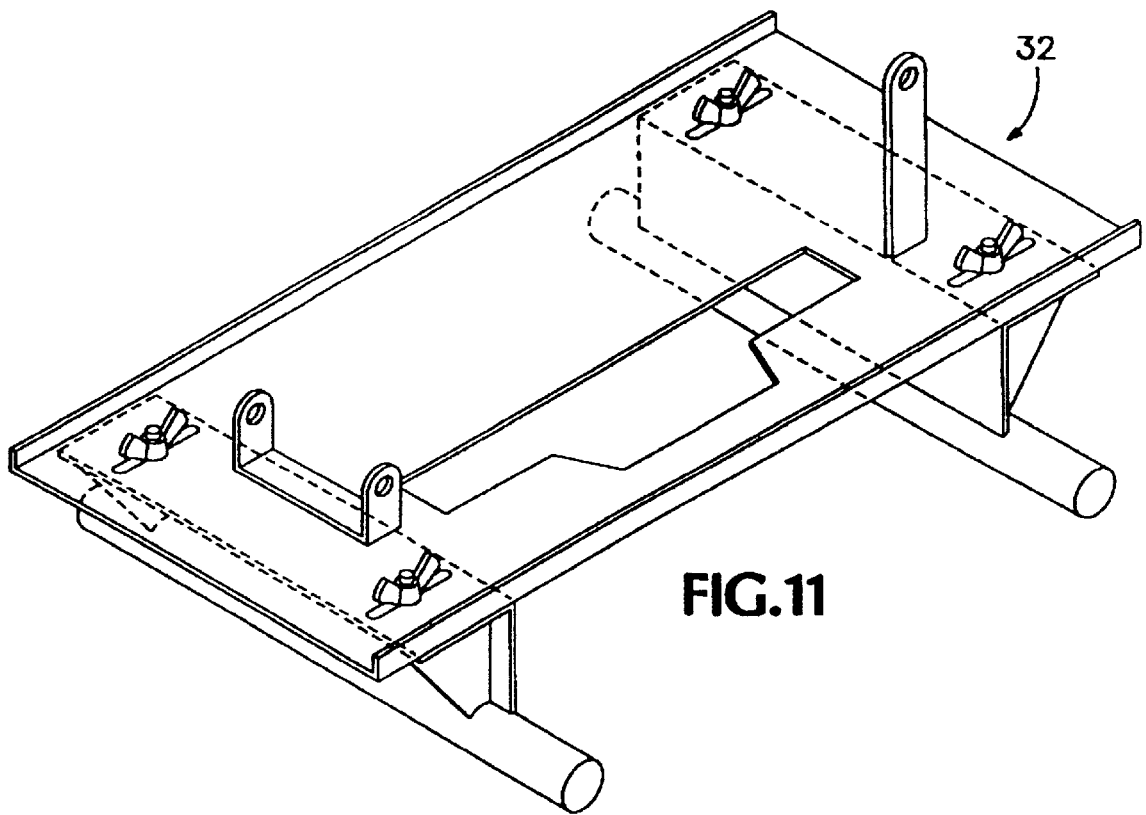
FIG. 11 is a perspective view of an optional foot of the present invention.
Figure 12:
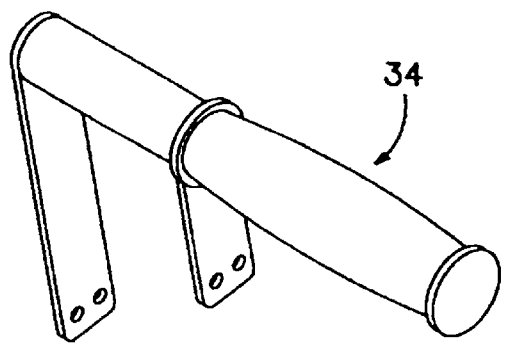
FIG. 12 is a perspective view of an optional handle of the present invention.
Figure 13:
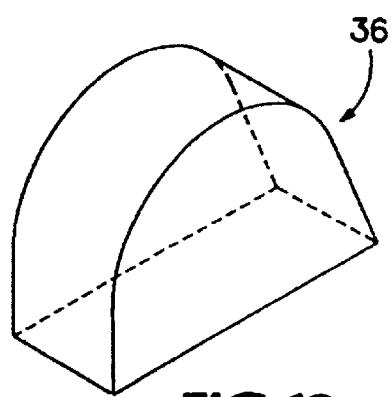
FIG. 13 is a perspective view of an optional safety guard of the present invention.

The invention optionally may include a specially designed foot 32 (FIG. 11) for setting a cut depth, a specially designed handle 34 (FIG. 12), and a specially designed safety guard 36 (FIG. 13). The foot 32 sets the depth of the cut and holds the cutting and beveling tool 20 square to the pipe 10 for a straight cut. It is designed to be stiffer than a standard foot and to hold the safety guard 36. The foot may include one or more stabilizers, but is shown with two adjustable stabilizing tubes. The handle 34 is designed to help hold the cutting and beveling tool 20 for cutting and beveling in the correct position. The safety guard 36 may be made of a protective material such as polycarbonate and covers the beveling blade 30 while it is on the cutting and beveling tool 20.

FIGS. 2 and 10 show generally how the cutting and beveling tool 20 uses the beveling blade 30 to bevel simultaneously while the cutting blade 24 cuts a pipe 10. Specifically, this method begins by providing a pipe and the cutting and beveling tool 20 with a cutting blade 24 and a beveling blade 30. The cutting blade 24 and beveling blade 30 are then placed on the circumference of an intermediate portion of the pipe 10. A user then rotates the cutting blade 24 and the beveling blade 30 on a common axis of rotation to initiate the cutting blade 24 cutting the pipe and the beveling blade 30 beveling the pipe 10. The user then rolls the pipe 10 in a first direction to continue the cutting blade 24 cutting and the beveling blade 30 beveling the pipe 10 along the pipe circumference. By resting the guiding and stabilizing foot 32 on the circumference of the pipe 10, the foot 32 guides and stabilizes the blades 24 and 30 so that the cut is both straight and uniform.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A beveling blade comprising:
   (a) a head having a first face with a first diameter and a second face with a second diameter, said first diameter being greater than said second diameter, said first face being annularly connected to said second face by an exterior annular slanted beveling circumference;
   (b) at least one tooth insert and at least one cartridge, said at least one tooth insert interconnectable with a respective at least one cartridge; and
   (c) said head defining at least one notch therein, said at least one notch suitable for accommodating a respective at least one tooth insert interconnected with a respective at least one cartridge.

2. The beveling blade of claim 1 wherein said at least one tooth insert has at least two cutting edges.

3. The beveling blade of claim 1 wherein said at least one tooth insert is reversible.

4. The beveling blade of claim 1 wherein said at least one tooth insert has at least one cutting edge, said at least one cutting edge having chipping notches defined therein.

5. A cutting and beveling tool comprising:
   (a) a cut-off saw having a cutting blade rotatable about an axis of rotation; and
   (b) a beveling blade adjacent and parallel to said cutting blade, said beveling blade rotatable about said axis of rotation;
   (c) wherein said cutting blade cuts simultaneously while said beveling blade bevels.

6. A cutting and beveling tool comprising:
   (a) a cut-off saw having a cutting blade rotatable about an axis of rotation; and
   (b) a beveling blade adjacent and parallel to said cutting blade, said beveling blade rotatable about said axis of rotation, said beveling blade comprising:
      (i) a head having a first face with a first diameter and a second face with a second diameter, said first diameter being greater than said second diameter, said first face being annularly connected to said second face by an annular slanted circumference;
      (ii) at least one tooth insert and at least one cartridge, said at least one tooth insert interconnectable with a respective at least one cartridge; and
      (iii) said head defining at least one notch therein, said at least one notch suitable for accommodating a respective at least one tooth insert interconnected with a respective at least one cartridge;
   (c) wherein said cutting blade cuts simultaneously while said beveling blade bevels.

7. A cutting and beveling tool comprising:
   (a) a cut-off saw having a cutting blade rotatable about an axis of rotation; and
   (b) a beveling blade adjacent and parallel to said cutting blade, said beveling blade rotatable about said axis of rotation, said beveling blade comprising:
      (i) a head having a first face with a first diameter and a second face with a second diameter, said first diameter being greater than said second diameter, said first face being annularly connected to said second face by an annular slanted circumference; and
      (ii) said annular slanted circumference having an abrasive surface thereon;
   (c) wherein said cutting blade cuts simultaneously while said beveling blade bevels.

8. The tool of claim 5 further comprising a stabilizing foot attached to said cut-off saw.

9. The tool of claim 5 further comprising a handle attached to said cut-off saw.

10. The tool of claim 5 further comprising a safety guard attached to said cut-off saw.

11. A method for simultaneously cutting and beveling a pipe, said method comprising the steps of:
    (a) providing a pipe with circumference, a first end, a second end, and an intermediate portion between said first and second end;
    (b) providing a cutting and beveling tool with both a cutting blade and a beveling blade with an exterior annular slanted beveling circumference;
    (c) positioning said cutting blade and said beveling blade on said circumference within said intermediate portion of said pipe;
    (d) rotating said cutting blade and said beveling blade on a common axis of rotation to initiate said cutting blade cutting said pipe and said beveling blade beveling said pipe; and
    (e) rolling said pipe in a first direction to continue said cutting blade cutting and said beveling blade beveling said pipe along said circumference.

12. A method for simultaneously cutting and beveling a pipe, said method comprising the steps of:
    (a) providing a pipe with circumference, a first end, a second end, and an intermediate portion between said first and second end;
    (b) providing a cutting and beveling tool with a cutting blade and a beveling blade;
    (c) providing said cutting and beveling tool with a guiding foot;
    (d) positioning said cutting blade and said beveling blade on said circumference within said intermediate portion of said pipe;
    (e) rotating said cutting blade and said beveling blade on a common axis of rotation to initiate said cutting blade cutting said pipe and said beveling blade beveling said pipe;

(f) resting said guiding foot on said circumference of said pipe; and (g) rolling said pipe in a first direction to continue said cutting blade cutting and said beveling blade beveling said pipe along said circumference, said guiding foot guiding said cutting blade and beveling blade during said step of rolling said pipe.

13. A method for simultaneously cutting and beveling a pipe, said method comprising the steps of:

(a) providing a pipe with circumference, a first end, a second end, and an intermediate portion between said first and second end;

(b) providing a cutting and beveling tool with a cutting blade and a beveling blade;

(c) providing said cutting and beveling tool with a stabilizing foot;

(d) positioning said cutting blade and said beveling blade on said circumference within said intermediate portion of said pipe;

(e) rotating said cutting blade and said beveling blade on a common axis of rotation to initiate said cutting blade cutting said pipe and said beveling blade beveling said pipe;

(f) resting said stabilizing foot on said circumference of said pipe; and (g) rolling said pipe in a first direction to continue said cutting blade cutting and said beveling blade beveling said pipe along said circumference, said stabilizing foot guiding said cutting blade and beveling blade during said step of rolling said pipe.

* * * * *